2 Sheets—Sheet 1.
J. & J. RITTY.
Cash Register and Indicator.
No. 221,360. Patented Nov. 4, 1879.
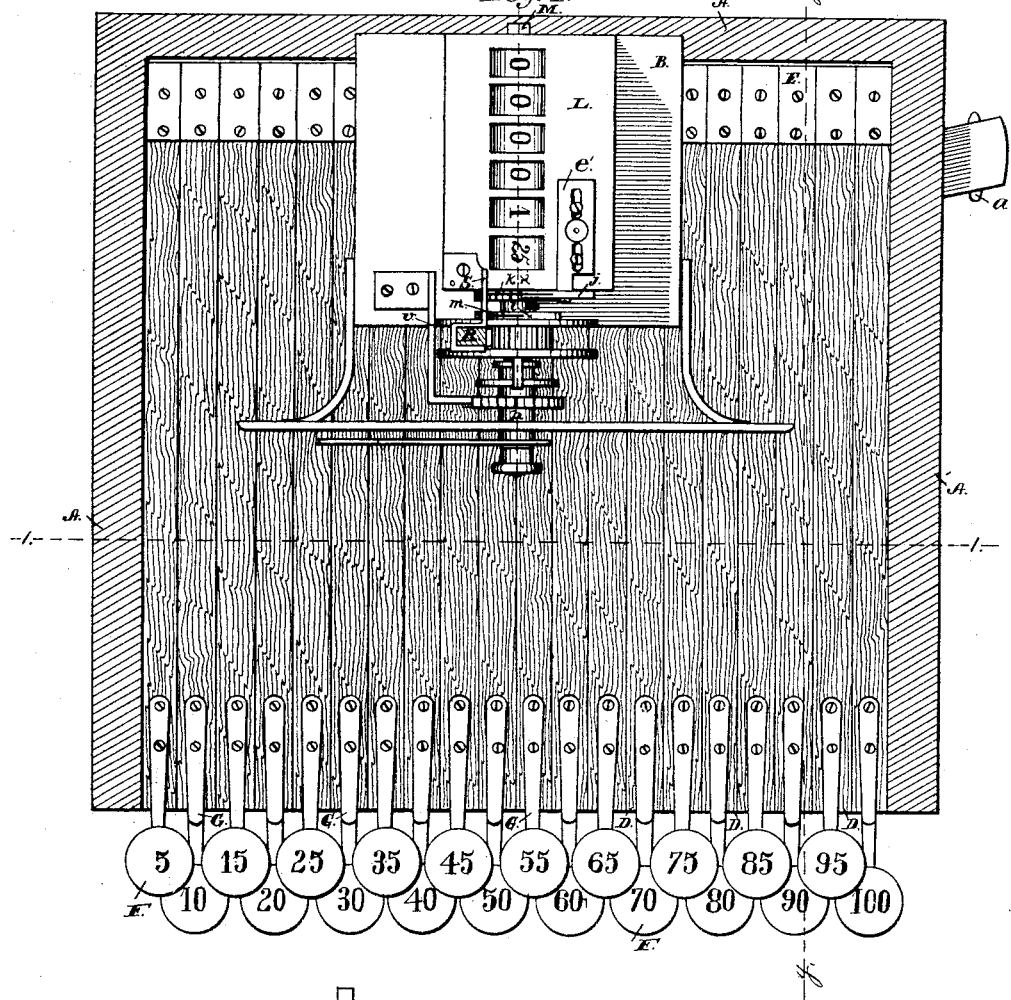
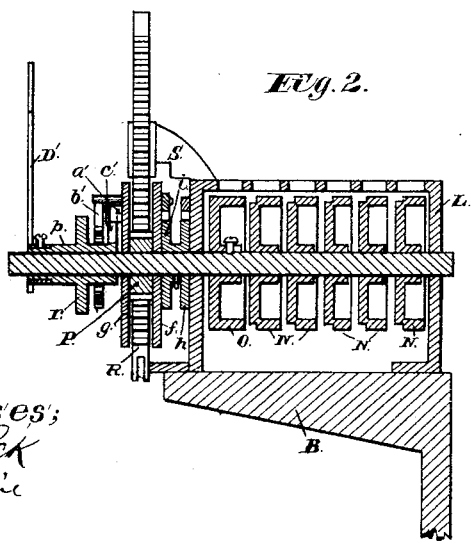
Witnesses;
Chas. M. Peck
Wm Ritchie
Inventors;
James Ritty and
John Ritty,
by Peck & Ritchie
their Attys;

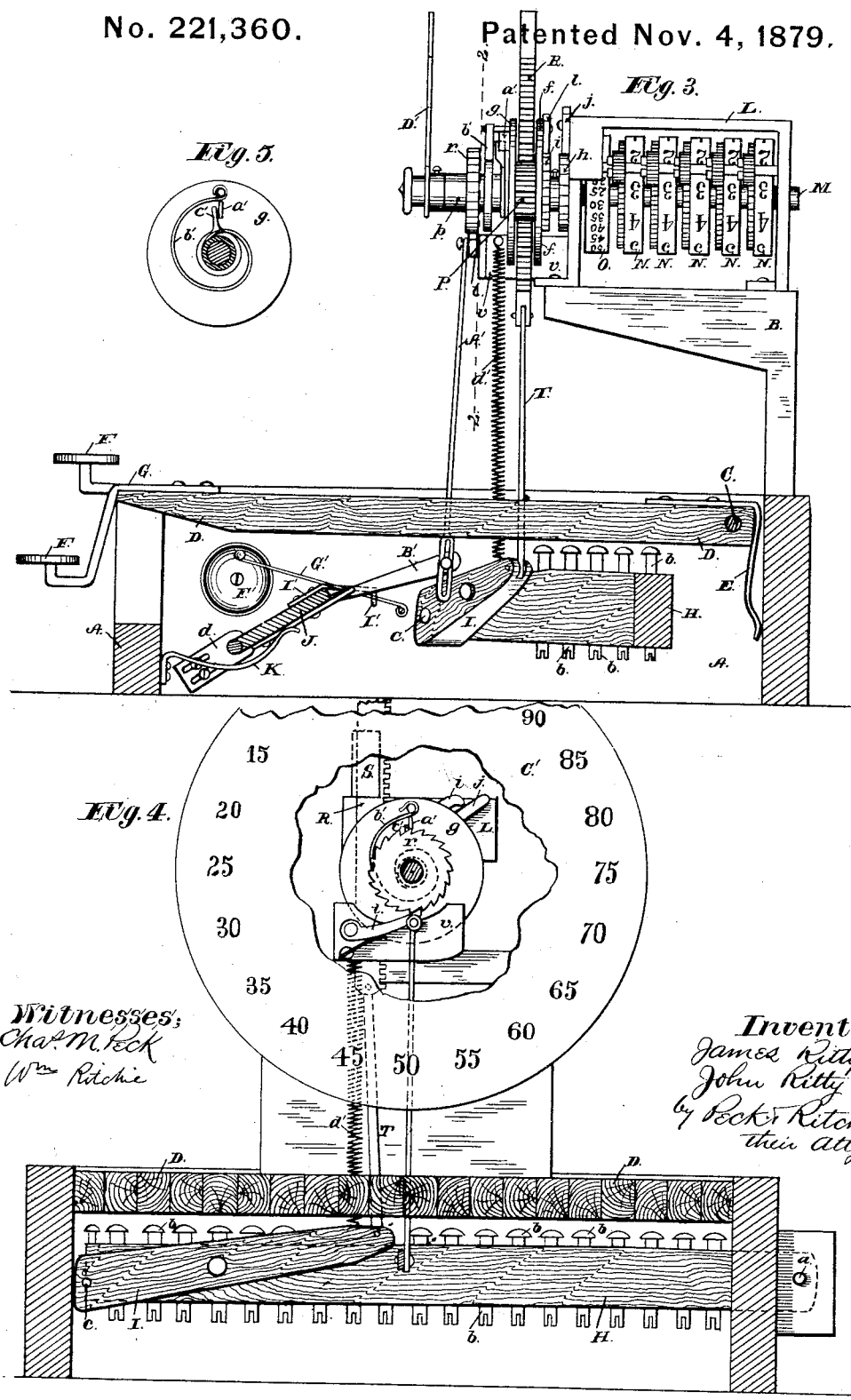

UNITED STATES PATENT OFFICE.

JAMES RITTY AND JOHN RITTY, OF DAYTON, OHIO.

IMPROVEMENT IN CASH REGISTER AND INDICATOR.

Specification forming part of Letters Patent No. 221,360, dated November 4, 1879; application filed March 26, 1879.

*To all whom it may concern:*

Be it known that we, JAMES RITTY and JOHN RITTY, of Dayton, in the county of Montgomery and State of Ohio, have invented certain new and useful Improvements in Cash Recorders and Indicators; and we do hereby declare the following to be a full, clear, and exact description of the same.

Our invention relates to an improved cash register and indicator for use by store-keepers and others as a means of accurately ascertaining, and at a glance, the total receipts taken in by the employés for any given period of time— as a day, for instance.

The machine consists, essentially, of an inclosed case or frame provided with an index-dial and indicator operated by a system of levers or keys and connected with a series of co-operating disks marked with numbers on their peripheries, a row of which numbers are disclosed by a transverse opening or openings in the case to show at a glance the sum-total of cash receipts. The office of the indicator is to show the amount of each payment as received. Connected with the machine is a bell or other sounding device, which is operated whenever any of the keys are moved sufficiently to indicate their respective values, so that, if the bell or other alarm is not sounded, the customer is aware that the amount paid has not been properly recorded by the clerk or salesman.

The novelty of our invention consists in the construction, arrangement, and mode of operation of the various parts composing the machine, as will be herein specified, and more definitely set forth in the claims.

In the accompanying drawings, Figure 1, Sheet 1, is a plan view of our improved machine with the cover removed. Fig. 2, Sheet 1, is a side elevation of the registering mechanism through the line $x\ x$ of Fig. 1. Fig. 3, Sheet 2, is a side elevation of the machine through the line $y\ y$ of Fig. 1. Fig. 4, Sheet 2, is a front-elevation view through the line 1 1 of Fig. 1. Fig. 5, Sheet 2, is a detail view of the indicating mechanism through the line 2 2 of Fig. 3.

Corresponding letters of reference indicate like parts in all the figures.

A represents any suitable frame or inclosed box, in this instance made rectangular, and having at its rear side a bracket, B, located as shown, whereon to rest the registering mechanism.

Pivoted in the rear top portion of the box, upon a transverse shaft or rod, C, are a series of adjacent horizontal keys, D, extending to the front end of the box, as shown. These keys are provided in the rear with suitable springs E, as indicated, and are provided on their front ends with pressure-buttons F. In the present instance are shown twenty of these keys, and the buttons are mounted on alternate sets of upwardly and downwardly curved connecting-arms G, so as to form the buttons into two rows or banks, one above the other, as seen in Figs. 2 and 3. The buttons in the upper row, beginning at the left, are, in this instance, numbered, respectively, 5, 15, 25, and and so on progressively to 95, while those in the lower row are numbered in a corresponding series with 10 and ending with 100. This arrangement of the buttons is simply for convenience, to bring the keys within as narrow compass as possible.

If desired, the buttons could be arranged in one straight row by widening or spacing the keys. Beneath and near the pivotal ends of the keys is a diagonal lever-beam, H, suitably pivoted at the right-hand side to the box or case, as at $a$. Passing through this beam vertically under each of the keys is a series of set-screws, $b$, arranged so as to be adjusted from below, and pivoted to the side of the beam H near its free end is a second shorter lever, I, with one end pivoted in any suitable way to the side of the case, as at $c$.

In the front portion of the case, extending beneath all of the keys, is a slanting wing-lever, J, having its ends pivoted in adjustable brackets $d$ attached to the side of the case. This lever is supported in its slanting position by a flat curved spring, K, attached to the front end of the box or case, as shown.

Upon the bracket B is a suitable case, L, in which is journaled a horizontal shaft, M, which projects out over the keys and is in line with them. Loose upon this shaft, within the case L, are a number of disks, N, each numbered on its periphery 0, 1, 2, 3, 4, 5, 6, 7, 8, 9. These disks are so constructed and united that the complete rotation of the first of the series causes the second to turn one-tenth of a revolution, and so on through the series. The construction of these disks forms no part of our invention, so that we will only explain their functions and connection with the rest of the machine.

Their construction and arrangement are, however, shown in full in the United States Patent to McNary, dated May 17, 1870. The first disk O of the series is in this instance numbered on its periphery 00, 5, 10, and so on to 95, making in all twenty numbers, corresponding to the numbers on the pressure-buttons. This last disk O is keyed to the shaft M just within the front face of the case L, so as to rotate with said shaft.

The top of the case L is provided with openings arranged transversely with relation to the disks, so that but one row of numbers can be seen at a time, as in Fig. 1.

Pivoted loosely upon the shaft M at a little distance in front of the case L is a pinion, P, attached to each side of which are flat disks $f$ and $g$, and keyed upon the same shaft, between the front face of the case L and the disk $f$, is a sleeve carrying at each end ratchets $h$ and $i$. The former of these rests against the face of the case L, while the latter is adjacent to the disk $f$. Each of these ratchets has as many teeth as there are numbers upon the disk O, and engaging with the ratchet $h$ is a pawl, $j$, pivoted to the case L, and held in contact with the ratchet by a spring, $k$, as seen in Fig. 1.

Upon the face of the disk $f$ is a pawl, $l$, which is held in engagement with the ratchet $i$ by a suitable spring, $m$, Figs. 1, 2, and 3.

If desired, one ratchet may be employed in the place of the two, $h$ and $i$, if made sufficiently wide to accommodate both pawls.

R represents a vertical rack-bar, which we designate as a "prime mover," located between the disks $f$ and $g$, and engaging with the pinion P. This bar is supported by any suitable guide, S, which may be attached to the case L, as represented. The lower end of the rack-bar is connected to the free end of the lever I by a pivoted connecting rod or link, T, which passes down through suitable apertures in the top of the key-case and the keys. Instead of this rack-bar and pinion, the disks $f$ and $g$ may constitute a drum, having an internal convolute or scroll spring, and having wound upon its periphery a cord or chain connected to the free end of the lever I, so that the depression of the latter will cause the drum to turn as the cord unwinds, and so that when the lever I is raised the internal spring will cause the drum and disks to return to their former positions, and will rewind the cord or chain.

In front of the disk $g$, upon the shaft M, is loosely fitted a sleeve, $p$, carrying a ratchet, $r$, having the same number of teeth as the before-described ratchets. This ratchet $r$ is held in engagement with a subjacent spring dog or pawl, $t$, pivoted to the front face of a bracket, $v$, of any proper construction, which may be attached to the case L or to the bracket B. Conveniently attached to this pawl $t$, near its engaging end, is a vertical connecting-rod, A', which, passing down through the key-case top and keys, has its lower end slotted to receive a stud or pintle attached to the end of an arm, B', which is secured to the wing-lever J in any suitable manner, so that by pressing upon the free end or edge of the wing the rod A' is depressed and the pawl disengaged from the ratchet. Upon removing the pressure, the spring upon the pawl causes its engagement with the ratchet.

Supported in any suitable manner upon the casing is a stationary vertical dial, C', arranged at right angles and concentrically with the shaft M, which projects through its eye. This dial is numbered to correspond with the numbers on the disk O, and in this instance has the dollar-mark ($) in place of the cipher. Just in front of this dial and upon the front end of the sleeve $p$ is fastened adjustably, but so as to move with said sleeve, an index-hand, D', which, as each key is pressed, points to a number on the dial corresponding in value to that upon the key pressed.

Instead of an index-hand, a second movable dial-disk may be attached to the sleeve $p$ in the same manner as the hand, and having an opening through it, which discloses any one of the numbers on the dial C'.

Upon the front face of the disk $g$ is a stud or detent, $a'$, situated about half-way between the center and the periphery. Just over this detent, and forming part of it, if desired, is a second stud, projecting from the face of the disk, and having secured to its end a flat convolute spring, $b'$, whose inner end is attached to the sleeve $p$ just behind the ratchet $r$, as indicated; and to the inner end of the sleeve $p$ is attached a projecting wing or arm, $c'$, Figs. 2 and 5, which comes in contact with the detent $a'$.

Attached to the bracket $v$ in any suitable way is a spiral spring, $d'$, which passes down through the casing and keys, and has its lower end connected to the free end of the lever I.

Within and attached to one side of the key-case is a bell or gong, F', having any suitable spring-striker, G', which is operated by an arm or connecting piece, I', attached to the wing J, so that by pressing upon the latter in the operation of the machine the bell is sounded.

The registering mechanism is inclosed in any proper case, which can only be opened by the proprietor to examine the amount registered, so that the only exposed and visible portions of the mechanism are the buttons, the dial, and the indicator.

Supposing the machine to be properly adjusted, with the visible numbers of the disks N and O set at nought, (0,) its operation is as follows: A customer, for instance, makes a purchase amounting to fifty cents, and pays for the same. The clerk then presses upon the button marked 50, and as the key is depressed it comes first in contact with the subjacent set-screw $b$ in the lever H, and presses down the latter. This depression of the lever H imparts a corresponding motion to the lever I, the connecting-rod T, and the rack R. The last, acting on the pinion P, rotates the disks $f$ and $g$. The detent $a'$ on the disk $g$, as it turns, comes in contact with the wing $c'$, and thus imparts motion to the ratchet $r$ and index-hand D', which turns with said disk. At the same time the dog or pawl upon the disk $f$ carries with it the ratchets $h$ and $i$, and also the shaft M, to which they are secured. The shaft M as it turns carries with it the disk O. The parts are so adjusted that when the key has reached its lowest point of depression the disk O will have turned sufficiently to bring the figure 50 under the opening in the case L, and the index-hand will have moved so as to point to the figure 50 on the dial. The wing J is so adjusted with relation to the keys that the latter do not move it until they have just about completed their depression. Consequently the bell is not sounded unless the keys are pressed down to their fullest extent, as far as they will go. As soon as the wing J is moved by the keys the pawl $t$ is drawn out of engagement with the ratchet $r$, though the latter is held from reverting by the detent $a'$.

Now, in the above illustration of the working of the machine, as soon as the key 50 is released the pawl $t$ instantly re-engages the ratchet $r$, and holds it and its connections from moving back to their former positions. At the same time the pawl $j$ catches the ratchet $h$, and thus holds the disk O from turning back; but the spiral spring $d'$, by contracting, draws up the levers H and I to their former positions, and these latter, acting on the rack, cause it to ascend and restore the disks $f$ and $g$ and their attachments to their original positions. The amount paid is thus permanently registered by the disk O, and is indicated by the index-hand on the dial in view of the customer.

Should seventy-five cents be the next amount to be registered, the corresponding key—that is, the one marked 75—is pressed, and the same operation of the parts is repeated, and the index-hand remains stationary until the detent $a'$ comes in contact with the wing $c'$, and carries it and the ratchet around until the hand points to 75 on the dial. Now, while the hand has only moved from 50 to 75, yet the recording-disk O has traveled three-quarters of a revolution. This brings the figure 25 on the disk O under the reading-opening, and, as the disk O has thus made one entire revolution, the adjacent disk of the series N is turned one-tenth, and the figure 1 on its periphery is brought in view under the reading-opening. The reading of the register will then show that one dollar and twenty-five cents have been received, this amount being the sum of the fifty and the seventy-five cents supposed to have been paid in. It is to be noted that in this instance the disk O records the cents, while the disks N record dollars, the one next adjacent to the disk O representing units, the next farther off tens, the next hundreds, and so on.

We will now suppose the next payment to be five (5) cents, the index-hand pointing to 75, where it was left by the last payment. The key numbered 5 is pressed down, and only moves the rack enough to cause the disk O to make one-twentieth of a revolution; but it moves the wing J and disengages the pawl $t$ from the ratchet $r$. As soon as the ratchet is released the convolute spring $b'$ (which had been contracted when the disk $g$ returned to the starting-point) is also released, and, expanding, throws the hand instantly back until the wing $c'$ comes in contact with the detent $a'$, and then stops. Upon releasing the key the parts are locked as before, and the machine is always ready set.

The most essential feature of our invention is the employment of the convolute spring, which we designate as a prime mover, for giving a reverse motion to the indicator and the wing $c'$, in connection with the detent $a'$ and the ratchet $r$, whereby, through the medium of the ratchet and its pawl, the hand is held at the proper indicating-point, and. whereby, through the medium of the spring and the detents $a'$ $c'$, the hand is given a reverse motion whenever a key of a less denomination is pressed after one of a higher denomination; for, in the way before explained, if ten cents is indicated on the dial and it is desired to register five cents, it is not necessary for the indicator to travel all around the dial to point to five cents, but it simply flies back one division upon the pressing of the proper key. This motion of the indicator is always true whenever a key of less denomination is recorded after one of a higher.

Another feature to be noted is that the point of stoppage of the detent $a'$ regulates that of the hand, and is itself regulated by the key which is pressed.

When, at the close of business hours, it is desired, after ascertaining the whole amount of cash received during the day, to reset the machine and start afresh with the recording-disks in such position as to indicate that no cash has yet been taken in or is on hand, this is done as follows: Adjustably secured to the top of the case L is the slide $e'$, located as shown, so that when moved forward its end will extend over and in contact with the free ends of the dogs $l$ and $j$. All that is necessary to turn the disks N and O back again to the zero or nought (0) points and reset the machine is to slide forward this piece $e'$ until it passes over the ends of the dogs $l$ and $j$. This will raise the other ends of said dogs and disengage them from the ratchets $h$ and $i$. The shaft M can then (by means of a crank or other convenient device at either end) be turned freely backward. This will cause the disks O and N to rotate in the same direction, and such rotation can be kept up until the zero-point on each disk is reached. The slide $e'$ can then be moved back, the dogs $l$ and $j$ allowed again to engage with their ratchets, and the machine is ready to start again. Of course this slide is not essential at all.

The dogs $l$ and $j$ can be disengaged by simply pressing down their free ends with the finger. The shaft M cannot, however, be revolved backward except these dogs are so disengaged. Consequently the machine cannot be reset without unclosing and exposing the case L.

By this construction and arrangement of the parts we produce an accurate and reliable machine, which will not only indicate the amount of each payment as it is made, but will keep a true record of the sum of all the payments, which can be read at a glance without the trouble of adding them up.

We are aware that it is not new in registers to use recording-disks, dials, bells, or keys; and consequently we make no claim, in its broad sense, to the application of such independent devices to a register; but

What we claim is as follows:

1. In a registering and indicating machine, the combination, with a series of keys, of an index-dial and indicator, with connecting mechanism, whereby, upon moving any one of the keys to its farthest limit, an indicator points to or discloses a number on the dial corresponding in value to that of the key operated, and whereby, upon operating a key of lower denomination after one of a higher denomination, a reverse motion is imparted to the indicator, as set forth.

2. In a registering and indicating machine, the combination, with registering mechanism and a series of keys, of an index-dial and indicator with connecting mechanism, whereby, upon successively operating the same key, the indicator remains stationary, while the registering mechanism registers the value of the key each time it is operated.

3. In a cash register and indicator, the combination of the operating-rack K or its equivalent, the stud or detent $a'$, actuated thereby, the wing or arm $c'$, connected to the index so as to move therewith, and the convolute spring $b'$, connecting said wing and detent, or their attachments, substantially as and for the purpose specified.

4. In a cash register and indicator, the combination, with the shaft M, to which are attached the register mechanism and indicator, of the loose concentric disks $f$ and $g$, connected on the one side to the registering mechanism by ratchets and pawls, and on the other to the indicator by a detent and a spring, whereby motion is imparted to both the registering and the indicating devices, as set forth.

5. In a cash register and indicator, the combination, with the disks $f$ and $g$ and their attachments, the sleeved ratchet $r$ and its attachments, of the spring-pawl $t$, connected to the wing J, as and for the purpose specified.

6. In a cash register and indicator, the combination, with the indicator-ratchet $r$, its pawl $t$, and a series of operating-keys, of an adjustable wing-lever, J, extending beneath and across the keys, and so arranged as to be operated to release the pawl $t$ from the ratchet $r$, only when any of the keys has reached its farthest limit of depression, as set forth.

7. In a registering and indicating machine, the combination with registering and indicating mechanisms and a series of keys, each representing a fixed value, of two prime movers connected to said recording and indicating mechanisms, and connected to each other by a stop or detent, with intermediate mechanism, in such a manner that in operating any key of the series the position of said stop or detent, just before the release of the key, determines the position of the index-hand or indicator, as set forth.

Witness our hands this 17th day of March, A. D. 1879.

JAMES RITTY.
JOHN RITTY.

Witnesses:
PATRICK H. GUNCKEL,
CHAS. M. PECK.